(12) United States Patent
White (10) Patent No.: US 9,145,831 B1
(45) Date of Patent: Sep. 29, 2015

(54) RECUPERATED GAS TURBINE SYSTEM FOR REACTION-JET HELICOPTERS

(71) Applicant: RJ Helicopter Corporation, Scottsdale, AZ (US)

(72) Inventor: David J White, La Mesa, CA (US)

(73) Assignee: RJ Helicopter Corporation, Scottsdale, AZ (US)

( * ) Notice: Subject to any disclaimer, the term of this patent is extended or adjusted under 35 U.S.C. 154(b) by 0 days.

(21) Appl. No.: 14/591,375

(22) Filed: Jan. 7, 2015

Related U.S. Application Data

(60) Provisional application No. 62/015,258, filed on Jun. 20, 2014.

(51) Int. Cl.
*F02C 7/08* (2006.01)
*F01D 1/32* (2006.01)
*F02K 7/00* (2006.01)

(52) U.S. Cl.
CPC ... *F02C 7/08* (2013.01); *F01D 1/32* (2013.01); *F02K 7/005* (2013.01)

(58) Field of Classification Search
CPC ............. F02K 7/005; F01D 1/32; F02C 3/16; F02C 7/10; F02C 7/08
See application file for complete search history.

(56) References Cited

U.S. PATENT DOCUMENTS

| | | | | |
|---|---|---|---|---|
| 5,081,834 | A | * | 1/1992 | Darragh ..................... 60/39.511 |
| 2001/0052231 | A1 | * | 12/2001 | Ryan ........................... 60/39.511 |
| 2002/0178725 | A1 | * | 12/2002 | Dev ............................... 60/723 |
| 2009/0277154 | A1 | | 11/2009 | Wood |

* cited by examiner

*Primary Examiner* — Gerald L Sung
(74) *Attorney, Agent, or Firm* — Etherton Law Group, LLC (57) ABSTRACT

A reaction-jet helicopter with a recuperator. Hot gas exiting the recuperator is directed to the helicopter's hollow-body rotor blades to increase the energy of the air exiting the jets and thus increase thrust and improve fuel efficiency. Hot gas exiting the recuperator may also be directed to the gas turbine of the helicopter's engine, further increasing fuel efficiency. A splitter valve on the exit side of the recuperator may be employed to direct exiting gas for one or more desired uses. The recuperator includes a heat exchanger, preferably an all-prime surface heat exchanger. The recuperator system may be combined with a circulation control system on the hollow-body rotor blades to further increase fuel efficiency.

7 Claims, 8 Drawing Sheets

RECUPERATED GAS TURBINE SYSTEM FOR REACTION-JET HELICOPTERS

CROSS-REFERENCE TO RELATED APPLICATIONS

This application claims the benefit of U.S. Provisional Application No. 62/015,258 filed Jun. 20, 2014. entitled Recuperated Gas Turbine System for Reaction-Jet Helicopters.

FIELD OF INVENTION

This invention relates to propulsion systems for reaction-jet helicopters.

BACKGROUND

Reaction-jet helicopters use compressed air delivered through hollow-body rotor blades to induce rotational movement of the blades, unlike conventional helicopters which use a mechanical transmission system to transfer power from the engine to rotate the blades. Reaction jets, also known as pressure jets and tip jets, are nozzles located at the tip of these hollow-body blades. The air travels through the hollow blades from root to tip and exits at sonic or supersonic speed at the nozzles. The thrust generated as the air exits the nozzles generates the blades' rotational movement.

The motive air is generally delivered to the rotor blades from a compressor that is driven by the helicopter's engine, whether gas turbine or piston. Alternatively air can be bled from the compressor discharge. Reaction-jet helicopters come in three variants, cold, warm or hot cycle tip-jet systems that are differentiated on the basis of the gas temperature entering the rotor blades. The gas temperature depends on the source of the motive air. Cold-cycle tip-jet systems receive relatively cool air diverted from air exiting the compressor before it enters the burner. Hot cycle tip-jet systems receive air post-burner, which of course is hotter than the air entering the burner. Hot air delivered to the rotor blades provides more thrust than cooler air for a given amount of air.

Reaction-jet helicopter systems are much lighter than conventional helicopters because by using air to propel the rotor blades, they do not require the heavy mechanical transmission system to drive the rotor blades. Because reaction jet helicopters are lighter, the reaction jet will generally carry more cargo (freight or passengers) than a conventional helicopter, for a given gross takeoff weight that includes the fuel load. The present reaction-jet designs however are less fuel efficient than conventional helicopters and, accordingly, for a given takeoff weight will not be able to fly as far. However, if some of the cargo weight is sacrificed for a heavier engine that is significantly more fuel efficient than a conventional helicopter engine, then the reaction-jet system of the present invention can be superior to a conventional helicopter.

A recuperator is a special purpose heat exchanger positioned within the air flow of an engine that recovers waste heat from the engine, typically to increase the engine's overall efficiency. For example, in a gas turbine engine, air is compressed and mixed with fuel, which is then burned and used to drive a turbine, generating hot exhaust. A recuperator coupled to the engine between the turbine and the exhaust captures and returns some of the waste heat in the exhaust to the compressed air, thus preheating it before entering the fuel burner stage. Since the gases have been pre-heated, less fuel is needed to heat the gases up to the turbine inlet temperature. Thus, by recovering some of the energy usually lost as waste heat, the recuperator can make a heat engine or gas turbine significantly more efficient.

It would be desirable to increase the fuel efficiency of a reaction-jet helicopter. Therefore, it is an object of this invention to provide a reaction jet helicopter with a recuperator that can deliver hot air to the turbine and to the rotor blades.

SUMMARY OF THE INVENTION

This invention is a reaction-jet helicopter with a recuperator. Hot gas exiting the recuperator is directed to the helicopter's hollow-body rotor blades to increase the energy of the air exiting the jets and thus increase thrust and improve fuel efficiency. Hot gas exiting the recuperator may also be directed to the gas turbine of the helicopter's engine, further increasing fuel efficiency. A splitter valve on the exit side of the recuperator may be employed to direct exiting gas to the turbine or rotor blades or both. The recuperator includes a heat exchanger, preferably an all-prime surface heat exchanger. The recuperator system may be combined with a circulation control system on the hollow-body rotor blades to further increase fuel efficiency.

DETAILED DESCRIPTION OF THE INVENTION

Figure 1:
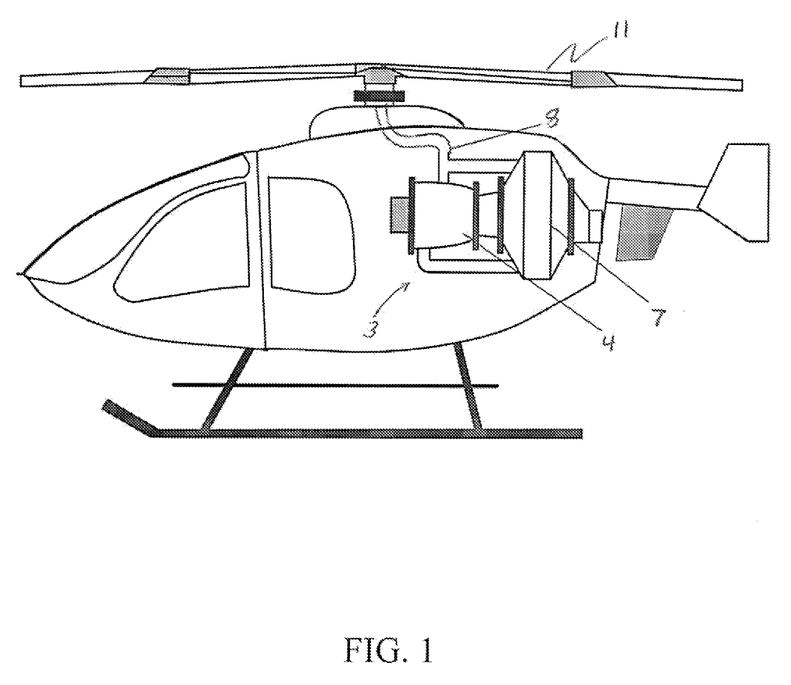
FIG. 1 is a schematic illustration of a reaction-jet helicopter with a recuperated gas turbine engine according to an embodiment of the present invention.
Figure 2:
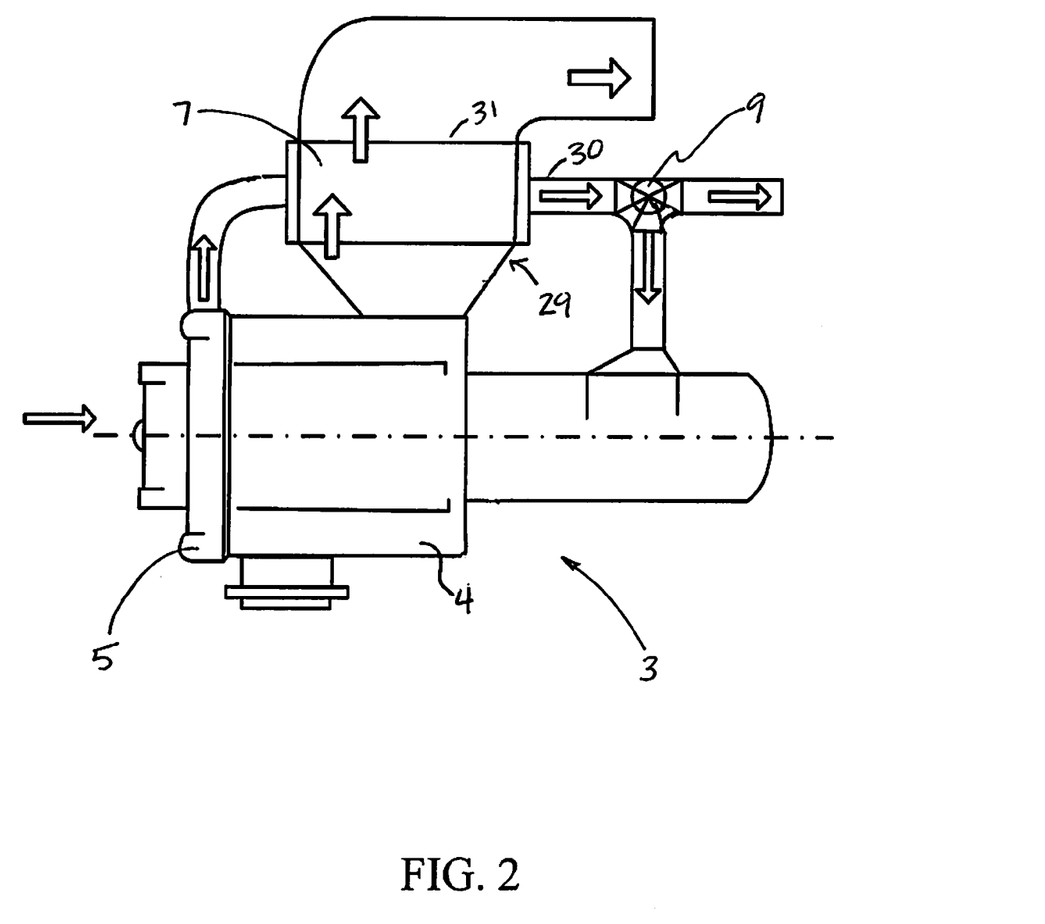
FIG. 2 is a schematic illustration of a recuperated engine according to an embodiment of the present invention.
Figure 3:
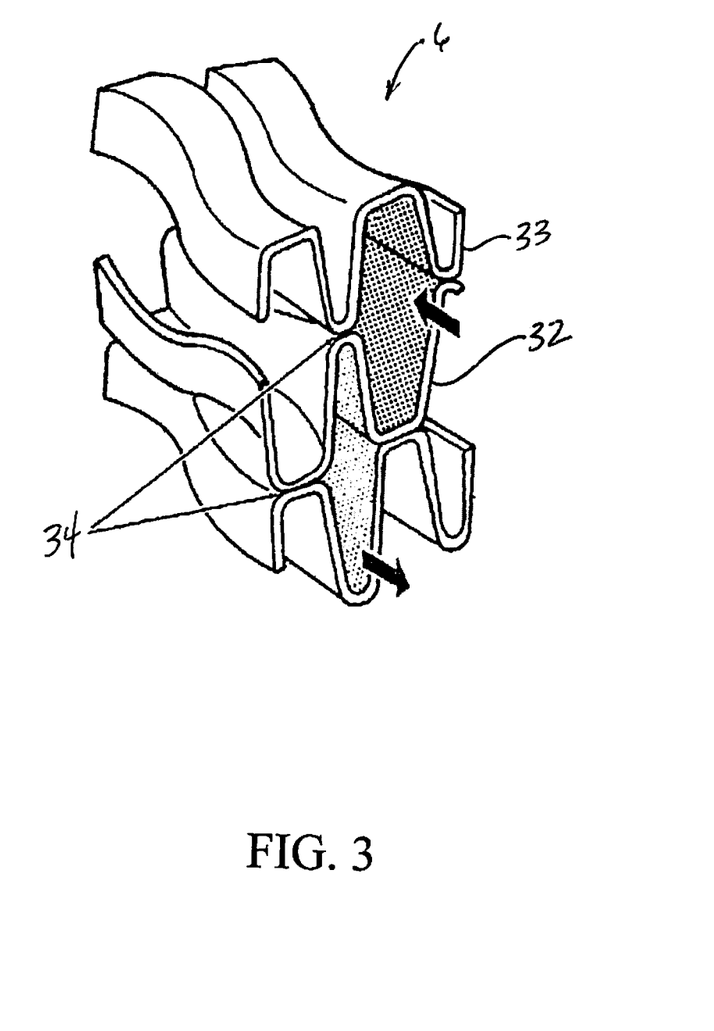
FIG. 3 is a perspective, cut-away view of an all-prime surface heat exchanger for use in conjunction with a recuperator of the present invention.

FIG. 1 illustrates a reaction-jet helicopter with a recuperated gas turbine engine according to an embodiment of the present invention. FIG. 2 is a close-up of the recuperated engine. A gas turbine engine 3 is coupled to a recuperator 7. The gas turbine engine 3 includes an upstream compressor 5 coupled to a downstream turbine 4, with a combustion chamber in between. As used herein, "gas turbine engine" refers to the engine as a whole and "turbine" when used alone refers to the turbine itself. Gas turbine engines include turbo shaft, turboprop and turbofan engines, all of which can be recuperated.

The recuperator 7 has an input side 29 to receive hot gas from the turbine 4, a heat exchanger 6, one or more ports from which the hot gas exits for re-use, and an exhaust side from which remaining gas is vented to the atmosphere. At least a portion of the hot gas exits the recuperator 7 from exit port 30 and is directed to the hollow-body rotor blades 11 via ducting 8. The gas exits the nozzles (not shown) of the blades 11 as a sonic or supersonic jet. The higher the temperature of the gas at the nozzle, the higher the sonic velocity and thus the higher the thrust for a fixed mass flow. Thus, because the recuperated air in the blades 11 is hotter than non-recuperated air in the blades of a conventional reaction-jet helicopter, it has higher energy, thus increasing thrust and improving fuel efficiency over a non-recuperated reaction-jet helicopter. See FIG. 5. This hot-cycle approach eliminates the load compressor and the gearbox of a non-recuperated reaction-jet helicopter. It may, however, require rotor blades and control valves made from heat-resistant materials, such as stainless steel, which may add weight and expense.

Hot gas exiting the recuperator 7 may also be directed to the turbine 4 of the helicopter's engine, further increasing fuel efficiency. A splitter valve 9 on the exit side of the recuperator may be employed to direct exiting gas to the blades 11 or back to the turbine 4. The splitter valve 9 may be controlled manually or automatically can vary the relative proportions of the hot gas directed to the hollow-body rotor blades and to the turbine.

Figure 4:
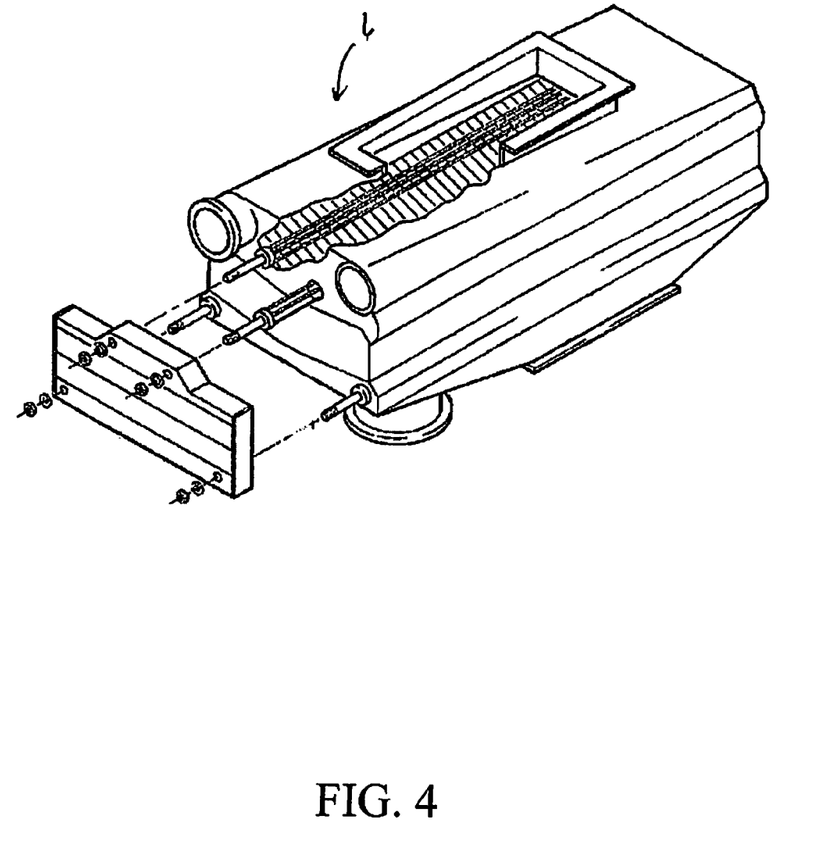
FIG. 4 is a perspective view of another all-prime surface heat exchanger for use in conjunction with a recuperator of the present invention.
Figure 6:
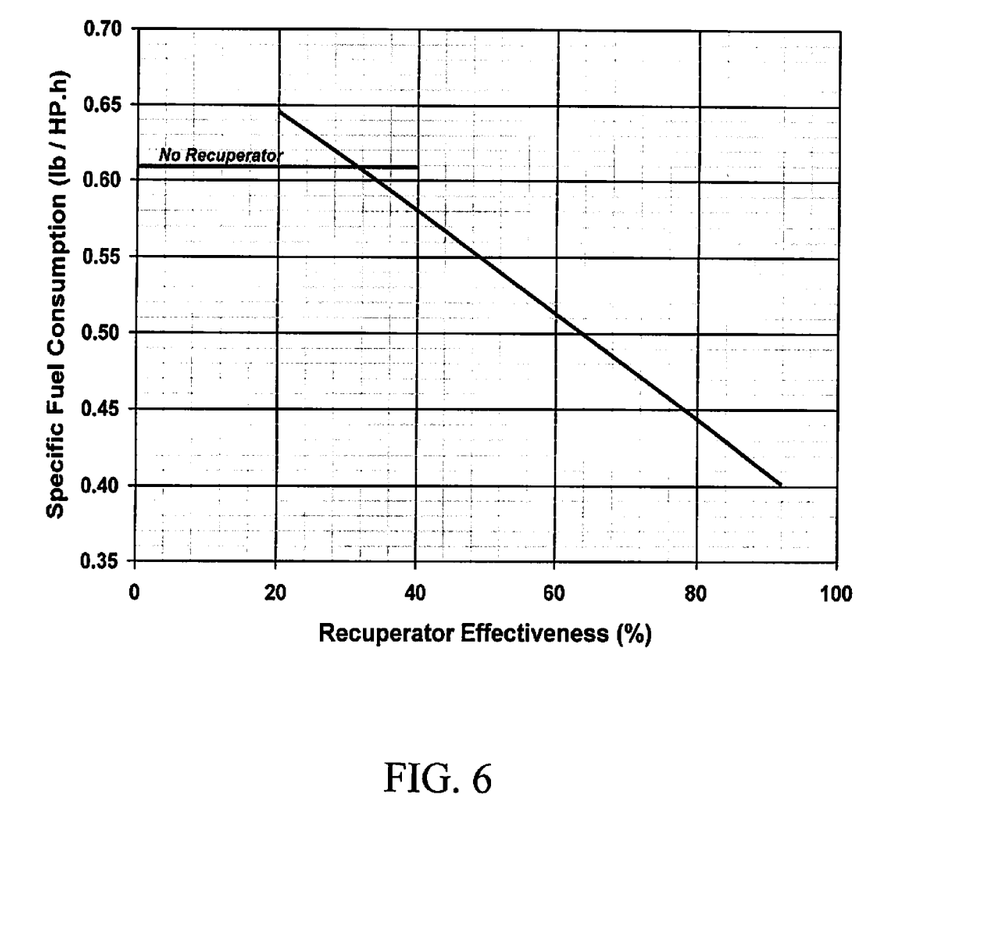
FIG. 6 is a graph of specific fuel consumption as a function of recuperator effectiveness in accordance with an embodiment of the present invention.

The preferred heat exchange system within the recuperator 7 is an all-prime-surface heat exchanger. Prime surfaces are those surfaces in direct contact with the heated air flowing through the heat exchanger 6, in contrast with heat exchangers that use fins, flattened tubes, and other heat sinks that are not in direct contact with the hot gas. All-prime-surface heat exchangers employ individual modules called air cells that are stacked together to provide sufficient flow and surface areas to provide for the desired air mass flow rate, and required pressure drop and effectiveness. These air-cells are intrinsically light and are typically fabricated from ~0.076-mm thick stainless steel. All-prime surface heat exchangers are available commercially, such as that pioneered by the Caterpillar Company and its subsidiary Solar Turbines Incorporated for industrial and commercial power generation gas turbines. FIG. 6 shows a cut-away view of a heat exchanger with prime heat-exchange surfaces 32 and 33. In the preferred embodiment these surfaces are in direct contact with each other at contact points 34, but they are not bonded together. FIG. 4 shows a partial cut-away view of another prime-surface heat exchanger.

Restraint systems are needed to keep the air cells together and to not expand under the differential air pressures between the cold and hot sides of the heat exchange surfaces. Most of the weight in the existing commercial recuperators is in the package and restraint systems that are typically made from heavy stainless steel plates and bars. In a preferred embodiment of the present invention, these heavy sections are replaced with lightweight structures such as honeycomb sandwich composites.

Because reaction-jet helicopters do not have the mechanical transmission system of a conventional helicopter, a reaction-jet helicopter is lighter. The lighter empty weight of a reaction-jet helicopter provides an opportunity for installing engines that are heavier than those used in conventional helicopters, yet still achieve greater fuel efficiency than a conventional helicopter. For example, a recuperator with lightweight restraints will be lighter than the main gearbox of a conventional helicopter and will provide higher engine efficiencies. Thus, although adding a recuperator to a reaction-jet helicopter increases the weight of the helicopter over the non-recuperated weight, a recuperated reaction-jet helicopter is more fuel efficient.

Figure 5:
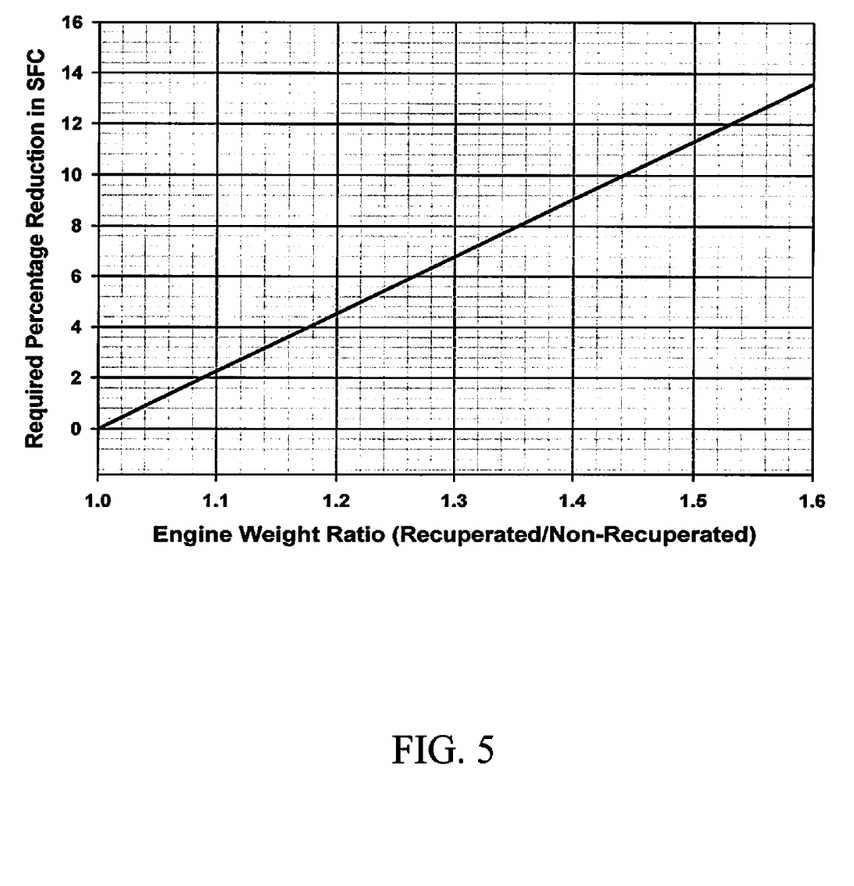
FIG. 5 is a graph of the reduction of specific fuel consumption as a function of the engine weight ratio of a recuperated: non-recuperated engine in accordance with an embodiment of the present invention.

Specific fuel consumption, SFC, describes the fuel efficiency of an engine design with respect to thrust output. For example, assume a weight ratio (recuperated to non-recuperated) of 1.3. To be competitive the additional weight of the recuperated helicopter requires a decrease in specific fuel consumption to provide the same operating range as the non-recuperated engine. FIG. 5 shows the required SFC decrease as compensation for weight increase in accordance with a preferred exemplary embodiment of the present invention is depicted. As shown in FIG. 5, a weight ratio of 1.3 corresponds to a SFC decrease of ~7.0%.

Refer now to FIG. 6, which shows specific fuel consumption as a function of recuperator effectiveness in accordance with a preferred embodiment of the present invention. Non-recuperated reaction-jet helicopters with a turbo shaft or modified turboprop engine typically show an SFC of around 0.61 or higher. In comparison, a recuperated version of the same engine could have a SFC as low as 0.43 assuming a recuperator effectiveness of ~85%. That is a reduction in SFC that is on the order of ~30%, considerably more than the ~7% needed to maintain Breguet range equivalency.

For a nominal 3000-lb gross takeoff weight helicopter the payload for a nonrecuperated reaction jet system is 32%-33% higher than a conventional helicopter of the same weight. If the proposed target weight ratio of a recuperated engine divided by the nonrecuperated variant of 1.3 can be met, then the recuperated 3000-lb reaction jet helicopter will still have a payload advantage of around 11%. This would make the recuperated reaction-jet helicopter range be on the same order as that of a conventional helicopter. This example shows that the fuel efficiency of a reaction-jet powered helicopter is greatly improved by the utilization of a recuperator.

Figure 7:
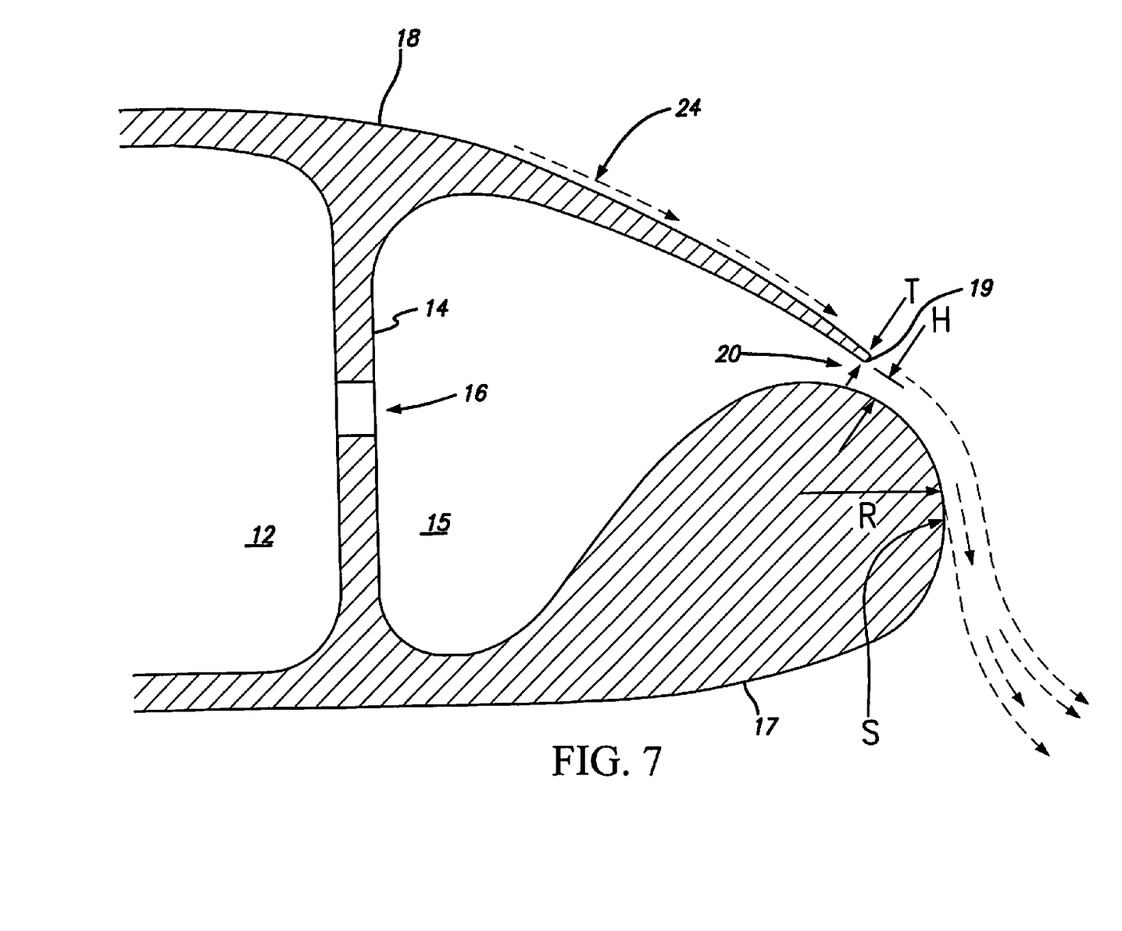
FIG. 7 is a cross-sectional partial view of a hollow-body rotor blade with circulation control according to an embodiment of the present invention.

The recuperator system may be combined with a circulation control system on the hollow-body rotor blades to further increase fuel efficiency. Referring to FIG. 7, a main air duct 12 of a hollow-body airfoil is in fluid communication with a tip air duct 15. The tip air duct 15 is formed by an upper surface 18 and a curved lower surface 17. The curved lower surface 17 is a Coanda surface having a radius of curvature R. The gas flowing in the main air duct 12 and the tip air duct is delivered there via ducting 8 from a recuperated engine, as explained above.

To ensure that the blade-tip reaction jets have the required isentropic velocities in the sonic to low supersonic range, the air pressure ratio over the nozzle has to be on the order of 2.2 or higher, yet to obtain good circulation control the pressure ratio over the Coanda surface has to be no higher than 1.8. To provide these conflicting pressure ratios the local flow pressure in the tip air duct 15 has to be reduced to a level below that in the main air duct 12.

To do so, in the preferred embodiment the main air duct 12 is separated from the tip air duct 15 with a partition 14 that has apertures 16 of known coefficient of discharge. The flow through these apertures 16 enters the tip air duct 15 to feed the slot 20. By using multiple holes the air can be distributed evenly along the tip air duct 15 length or alternatively at some desired uneven distribution. The pressure ratio in the tip air duct 15 over the film slot is around 1.8. The pressure drop over the apertures 16 is used to control the film mass flow rate independently of the slot height. The slot height and thus the thickness of the jet can then be adjusted to any desired value for a given slot length or area. In essence the slot height becomes independent of the pressure in the main air duct 12.

The upper surface 18 of the tip air duct 15 terminates in a lip edge 19 of thickness T. The lower and upper surfaces are spaced apart to form a slot 20 having a height H. In the preferred embodiment the lip edge is relatively sharp, and the thickness T is less than 0.4 times the slot height H to avoid a wake region downstream of the lip that disturbs the flow of air over the Coanda surface. For a reaction jet blade chord length of 8 inches, which is typical of small reaction-jet helicopters, the desired slot height H is about 0.2% of the chord or 0.015-inch. The slot 20 is typically located at X/C=88.75% on the upper side of the airfoil. The blade span that the slot width occupies is usually determined by the distribution of the intrinsic lift coefficient of the blade 11.

Under previously known circulation control airfoils the slot height, or more accurately the slot area and the pressure drop over it, controls both the mass flow and the velocity of the air jet 24. In this invention, the partition 14 is structured to separate the control of the mass flow from the slot height requirements. The partition 14 reduces the mass flow rate of the tangential air jet 24 necessary for a given amount of lift by reducing the pressure in the tip air duct 15. It does so by using one or more apertures 16 in the partition 24 so that the tip air duct 15 is in fluid communication with the main air duct 12. The apertures 16 may take on any shape, so long as their characteristic coefficient of discharge is known. Typically the apertures 16 will be circular or elliptical, as shown in FIG. 9. Alternatively, the apertures 16 may be rectangular, with square or rounded corners. As a result of the fluid communication between the main air duct 12 and the tip air duct 15, the slot height and the mass flow of the air jet 24 can be adjusted to any desired value. In essence the slot height becomes independent of the pressure in the main flow duct, which eliminates problems arising from the pressure reduction along the length of the duct as the air flow approaches the tip because of friction and other losses.

The apertures 16 may be placed at any location on the partition 14 but are preferably disposed in a straight line. The apertures 16 may be spaced apart uniformly or non-uniformly, based on the intrinsic coefficient of lift profile of a given blade. More apertures 16 are used to achieve higher levels of air flow at the highest lift coefficient locations, and conversely fewer apertures are used at the lower loft coefficient locations. Typically the apertures 16 are arranged to reduce in size from hub to tip in accordance with manifold design theory.

Figure 8:
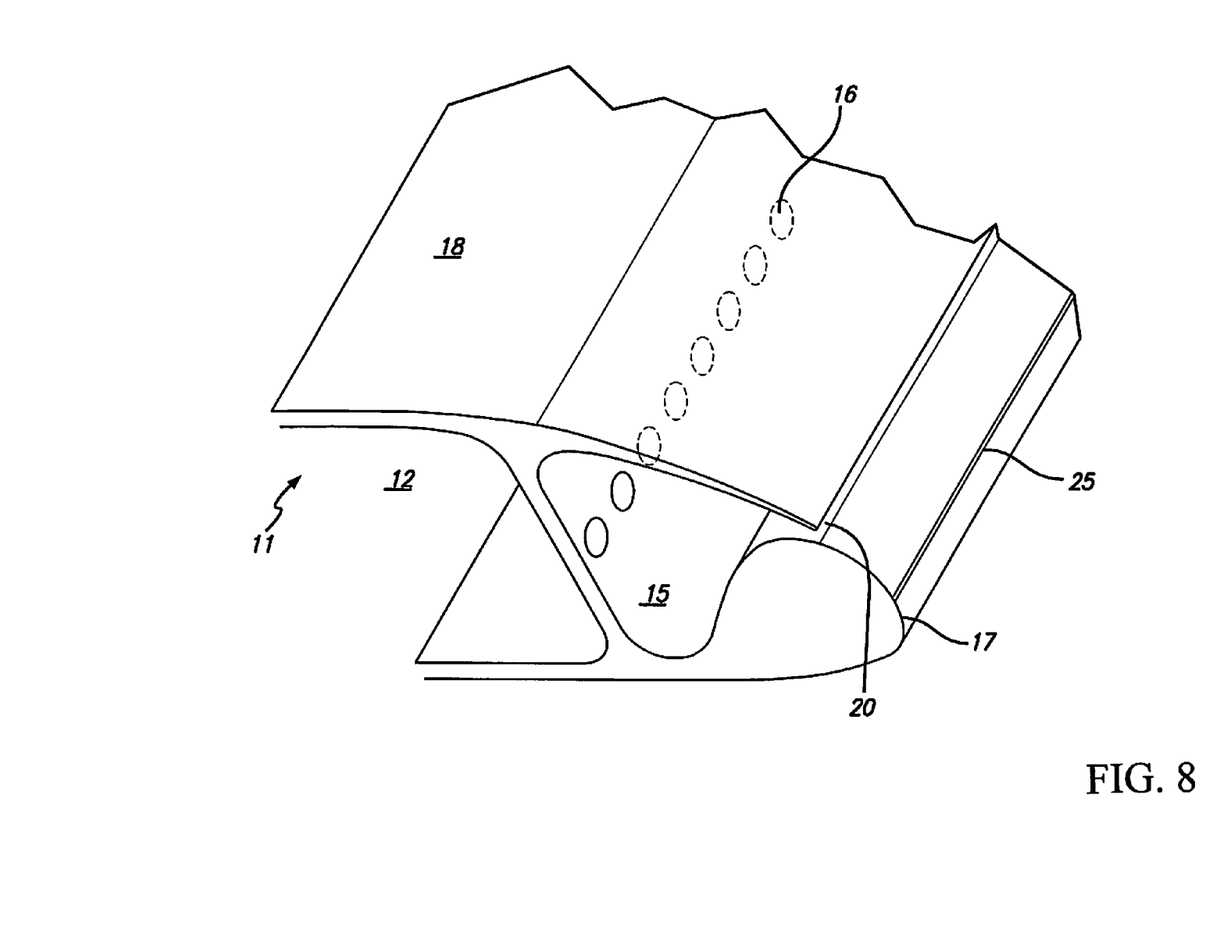
FIG. 8 is a perspective partial view a hollow-body rotor blade with circulation control according to an embodiment of the present invention.

A jet of air 24 travelling tangentially along the upper surface 18 crosses the slot 20 and follows the lower surface 17 until the air jet 24 separates at separation point S, which is typically at an angle between 120-125° from the lip exit. To minimize vibration and periodic lift forces, thus improving lift uniformity, a tip strip 25 is attached on the lower surface 17 at about the separation point S. See FIGS. 7 and 8. The tip strip 25 is a protuberance from the lower surface 17 used to force the separation to consistently take place along that line. The tip strip 25 is preferably a length of wire attached to the lower surface 17. The cross-section of the tip strip 25 can be any shape, such as circular or rectangular. The height of the tip strip 25 from the lower surface 17 depends on the Coanda surface shape and surface finish and is preferably determined experimentally.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

I claim:

1. A reaction-jet helicopter having hollow-body rotor blades, the helicopter comprising:
   a) a gas turbine engine comprising a compressor and a turbine; and
   b) a recuperator in communication with the turbine, wherein the recuperator has an input side to receive hot gas from the turbine and an exit port from which hot gas exits, wherein at least a portion of the hot gas exiting the recuperator is delivered to the hollow-body rotor blades and at least a portion of the hot gas exiting the recuperator is delivered to the turbine.

2. The reaction-jet helicopter of claim 1 wherein the recuperator further comprises an all-prime surface heat exchanger.

3. The reaction-jet helicopter of claim 1 further comprising a restraining plate securing the recuperator, the restraining plate made from stainless steel honeycomb sandwich material.

4. The reaction-jet helicopter of claim 1 further comprising a splitter valve in communication with the recuperator to direct portions of the hot gas exiting from the recuperator to the hollow-body rotor blades and to the turbine.

5. The reaction-jet helicopter of claim 4 wherein the splitter valve can vary the relative proportions of the hot gas directed to the hollow-body rotor blades and to the turbine.

6. The reaction-jet helicopter of claim 1 wherein the hollow-body rotor blade comprises:
   a) a main air duct; and
   b) a tip air duct in fluid communication with the main air duct; wherein the tip air duct comprises a curved lower surface and an upper surface wherein the lower and upper surfaces are spaced apart to form a slot having a height, such that air traveling across the upper surface follows the lower surface until the air separates at a separation point.

7. The reaction-jet helicopter of claim 6 further comprising a partition separating the main air duct and the tip air duct, the partition having one or more apertures therein.

* * * * *